United States Patent [19]

Bilas

[11] 3,743,315
[45] July 3, 1973

[54] TRAILER VEHICLE SUSPENSION

[76] Inventor: Michael Bilas, 2730 Columbiana, New Castle Road, New Springfield, Ohio 44443

[22] Filed: Jan. 21, 1972

[21] Appl. No.: 219,779

[52] U.S. Cl. ............................ 280/124 R, 180/24.02
[51] Int. Cl. ............................................ B60g 11/46
[58] Field of Search ..................... 280/124; 267/32; 180/22 D, 22 E, 24.02

[56] References Cited
UNITED STATES PATENTS
3,093,388  6/1963  Kulyk............................. 180/22 D
3,617,072  11/1971  Turner............................ 180/24.02

Primary Examiner—Philip Goodman
Attorney—Webster B. Harpman

[57] ABSTRACT

A trailer vehicle suspension suitable for trucks and trailers positions a wheel and axle assembly beneath the trailer vehicle and on the ends of a pair of trailing arms, a semi-elliptic spring positioned transversely of the vehicle and secured thereto and to the wheel and axle assembly lifts the same from a road surface. Air bags positioned between the wheel and axle assembly and the vehicle and means for inflating and deflating the air bags permit the wheel and axle assembly to be lifted from the road surface by the semi-elliptic spring or engaged on the road surface in a weight carrying relation to the trailer vehicle when the air bags are inflated.

5 Claims, 3 Drawing Figures

PATENTED JUL 3 1973 3,743,315

TRAILER VEHICLE SUSPENSION

BACKGROUND OF THE INVENTION

1. Field of the Invention

This invention relates to wheeled vehicles and more particularly to suspensions for trailer vehicles including trucks.

2. Description of the Prior Art

Prior suspensions of this type have employed springs normally urging the wheel and axle assembly away from the road surface and employed air bags for urging the wheel and axle assembly toward the road surface in supporting relation to the vehicle. Such prior art suspensions have positioned the springs longitudinally of the trailer and transversely of the axle of the wheel and axle assembly.

(See U.S. Pat. Nos. 2,989,300; 3,063,732; 3,093,388; 3,096,995; 3,113,745 and 3,285,621 and 3,617,072).

This invention eliminates some of the problems heretofore associated with the prior art vehicle suspensions and provides an arrangement wherein a single semi-elliptic lifting spring is positioned transversely of the trailer vehicle and secured thereto and to an axle of a wheel and axle assembly parallel therewith so as to normally lift the same toward the vehicle. This invention makes possible the use of a single spring for lifting a wheel and axle assembly rather than the pair of springs heretofore believed necessary.

SUMMARY OF THE INVENTION

A trailer vehicle suspension is disclosed which enables a single semi-elliptic spring or the like to function as a means for lifting an extra wheel and axle assembly away from a supporting road surface when the same is not needed for supporting a load on the trailer vehicle. A pair of air bags positioned between the vehicle and the wheel and axle assembly upon being inflated cause the wheel and axle assembly to engage the road surface in supporting relation to the vehicle.

DESCRIPTION OF THE PREFERRED EMBODIMENT

Figure 1:
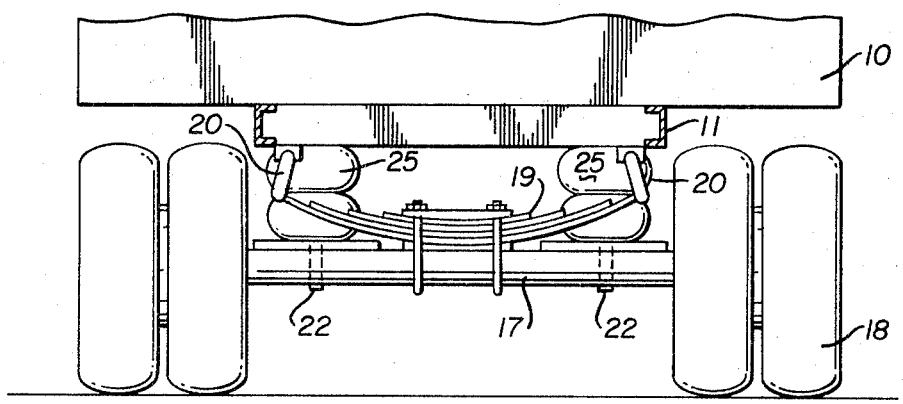
FIG. 1 is a transverse cross section of a trailer vehicle.
Figure 2:
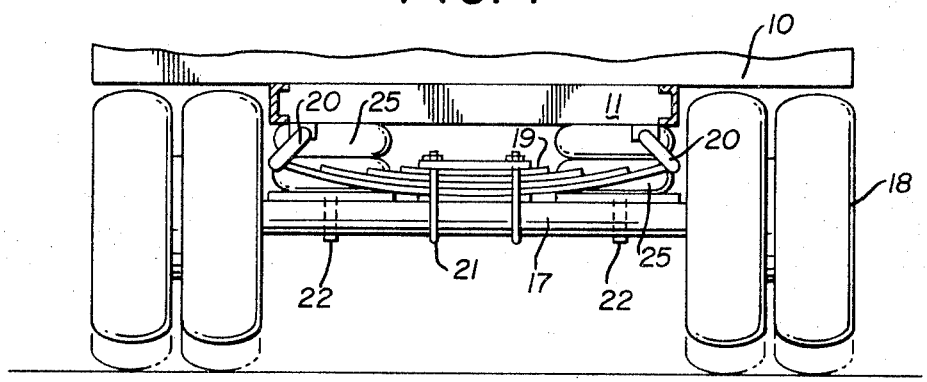
FIG. 2 is a transverse cross section of a trailer vehicle showing a wheel and axle assembly in raised position relative thereto.
Figure 3:
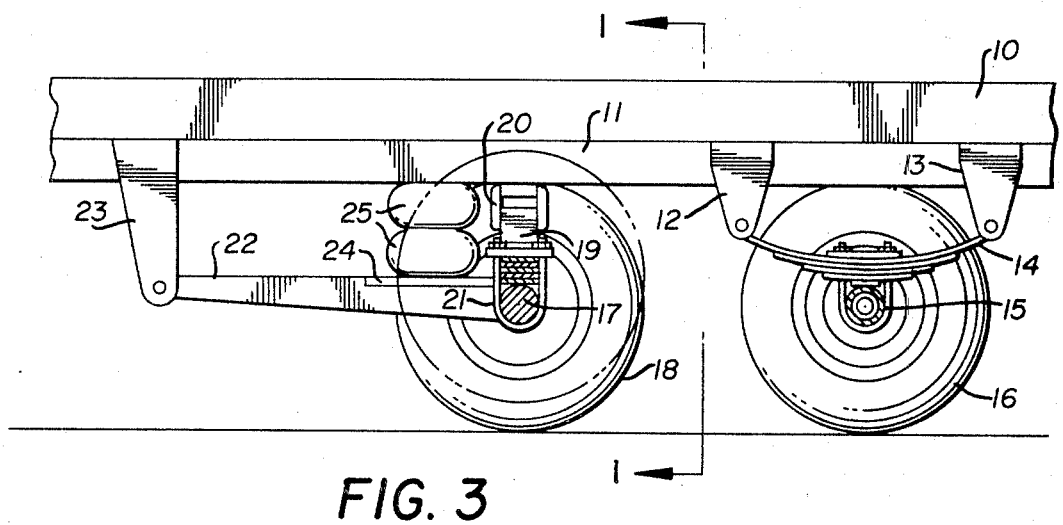
FIG. 3 is a side elevation of a trailer vehicle with parts broken away and parts in cross section. Lines 1—1 on FIG. 3 indicate the cross section of FIGS. 1 and 2.

In the form of the invention chosen for illustration and as seen in FIGS. 1, 2 and 3 of the drawings, a trailer vehicle 10 having a longitudinal frame 11 is provided with at least one conventional spring suspension unit including brackets 12 and 13 and a pair of springs 14 which are positioned longitudinally of the trailer vehicle and engaged upon an axle 15 having ground engaging wheels 16 thereon.

A secondary spring suspension unit is provided in association with a secondary axle 17 and secondary ground engaging wheels 18. A suitable semi-elliptic spring 19 or the like, is positioned transversely of the trailer vehicle and secured as by shackles 20 at opposite ends to the frame 11. The semi-elliptic spring 19 is also secured to the secondary axle 17 as by fasteners 21.

A pair of trailing arms 22 pivoted at their forward ends to supports 23 attached to the frame 11 of the trailer vehicle are engaged at their free ends on their axle 17 and are provided with platforms 24 adjacent the axle 17 so that a pair of inflatable air bags 25 may be positioned on the platforms 24 and against the frame 11. Inflation of the inflatable air bags 25 will distort the spring 19 and move the secondary axle 17 with its secondary wheels 18 into weight supporting relation on a road surface and thereby assist in supporting the trailer vehicle as will be understood by those skilled in the art.

At such time as the trailer vehicle is in an unloaded condition and it is desired to lift the secondary axle 17 and the secondary wheels 18 away from the road surface, deflation of the air bags 25 permits the spring 19 to lift the axle 17 and wheels 18 as shown in FIG. 2 of the drawings and in broken lines in FIG. 3 of the drawings.

Those skilled in the art will observe that a compressor driven by the engine of the truck or tractor towing the trailer vehicle, provides a source of compressed air and that the same may be directed by suitable piping connections through suitable valves and the like to the inflatable air bags and such as disclosed in the several afore mentioned prior art patents.

Those skilled in the art will observe that the trailing arms 22 hold the secondary axle 17 and its secondary ground engaging wheels 18 in desirable position beneath the trailer vehicle 10 while at the same time permitting it to move relative thereto.

It will thus be seen that an improved and simplified trailer vehicle suspension has been disclosed which enables an operator of a truck or a truck-trailer vehicle combination to lift an axle from ground engagement when in a no-load condition and thereby cut down on wear on the wheel and axle assembly which would otherwise take place as well as reducing the number of wheel and axle assemblies on the truck or trailer for tax purposes.

Although but one embodiment of the present invention has been illustrated and described it will be apparent to those skilled in the art that various changes and modifications may be made in the invention without departing from the spirit of the same and having thus described my invention what I claim is.

I claim:

1. A trailer vehicle suspension including a wheel and axle assembly, an elongated spring positioned transversely on said vehicle and attached to said vehicle and to said wheel and axle assembly, said elongated spring normally urging said wheel and axle assembly toward said vehicle and air bags between said wheel and axle assembly and said vehicle acting when inflated to move said wheel and axle assembly away from said vehicle and means for inflating and deflating said air bags.

2. The trailer vehicle suspension of claim 1 and wherein said elongated spring is a semi-elliptic spring substantially straight in unloaded condition.

3. The trailer vehicle suspension of claim 1 and wherein trailing arms are positioned longitudinally of said vehicle and pivoted thereto and have their trailing ends secured to said wheel and axle assembly.

4. The trailer vehicle suspension of claim 3 and wherein said air bags are positioned between said vehicle and said trailing arms and adjacent said wheel and axle.

5. The trailer vehicle suspension of claim 3 and wherein said elongated spring is a semi-elliptic spring and wherein shackles at the ends of said spring movably secure it to the opposite sides of said trailer vehicle and wherein the center section of said semi-elliptic spring is attached to the axle of said wheel and axle assembly.

* * * * *